Sept. 25, 1956 
C. A. ELLIS
2,764,058
PORTABLE COMBINED PHOTOGRAPHIC SLIDE
VIEWING AND PROJECTING DEVICE
Filed Nov. 1, 1952
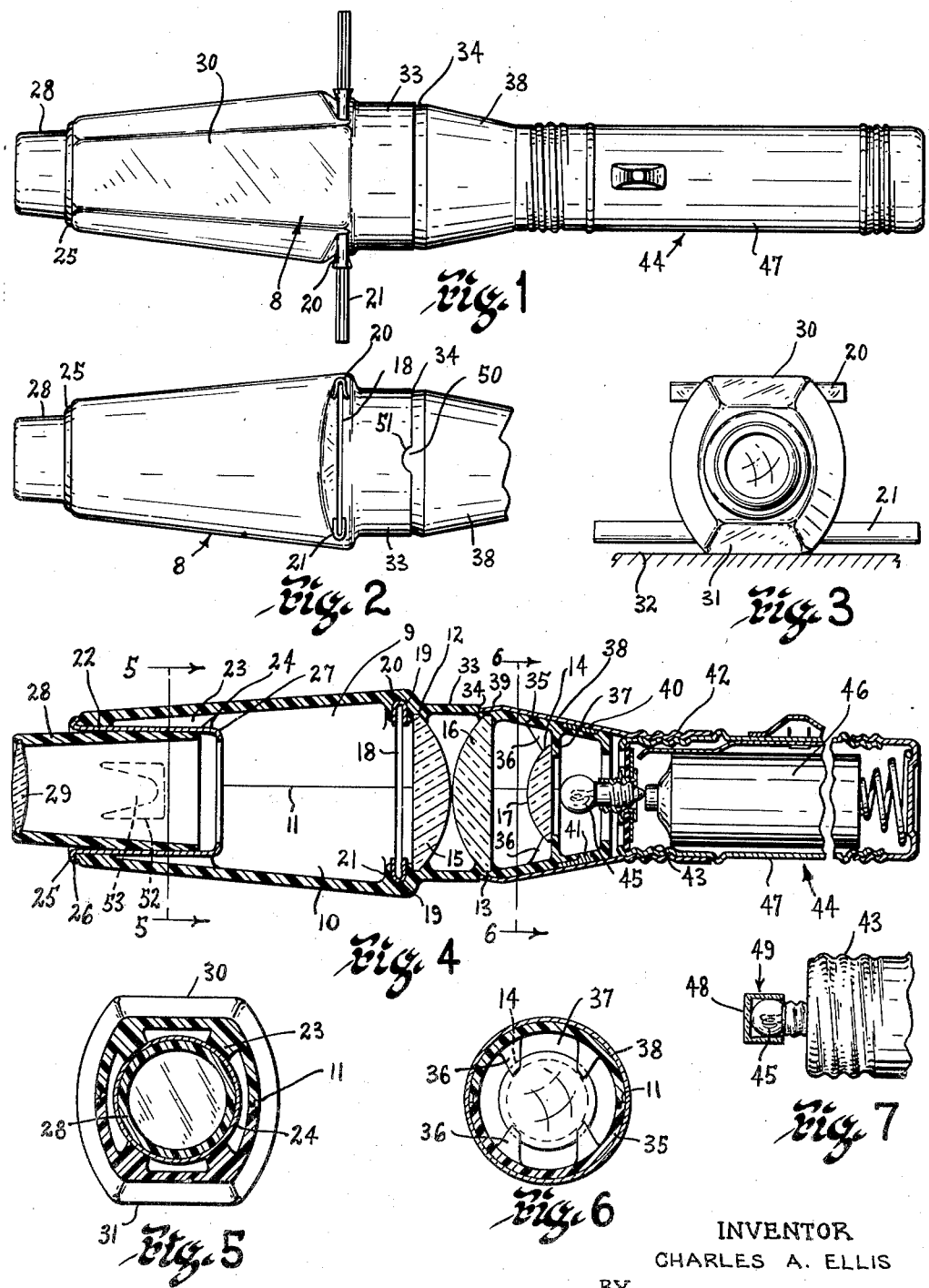
INVENTOR
CHARLES A. ELLIS
BY
Louis L. Gagnon
ATTORNEY

United States Patent Office 2,764,058
Patented Sept. 25, 1956

2,764,058

PORTABLE COMBINED PHOTOGRAPHIC SLIDE VIEWING AND PROJECTING DEVICE

Charles A. Ellis, Southbridge, Mass., assignor to American Optical Company, Southbridge, Mass., a voluntary association of Massachusetts Application November 1, 1952, Serial No. 318,199

9 Claims. (Cl. 88—24)

This invention relates to improvements in photographic slide viewing and projecting devices and relates particularly to the provision of a simple, compact and inexpensive device for illuminating photographic slides for direct viewing or for projecting an enlargement thereof on a viewing screen.

One of the principal objects of the invention is to provide an improved and more efficient photographic slide viewer and projector which is relatively small, light in weight, inexpensive and readily conveyable in the pocket of one's wearing apparel and which may be readily attached to a source of illumination, such as a flashlight or other suitable means.

Another object is to provide a combined viewer and projector of the above character having its component parts so controlled as to shape and size as to enable the device to be either held in the hand or placed on a suitable support, such as a table, during said viewing or projecting.

Another object is to provide a novel, light-diffusing arrangement for converting the device from a projector to a viewer.

Another object is to provide a device of the above character with an optical system which is so controlled according to the size of image desired as to produce maximum and uniform illumination throughout the area of the projected image.

Another object is to provide a housing construction suitable for fabrication by injection molding and which is formed in units which may be joined in pairs to complete the housing and having integrally formed therein means for readily positioning and supporting the optical units and other component parts of the device in proper relation with each other.

Another object is to provide a novel adjustable objective lens system and support therefor.

Other objects and advantages of the invention will become apparent from the following description taken in connection with the accompanying drawings, and it will be apparent that many changes in the details of construction and arrangements of parts may be made without departing from the spirit of the invention as set forth in the accompanying claims. The invention, therefore, is not to be limited to said details of constructions and arrangements of parts shown and described, as the preferred form only has been given by way of illustration.

Referring to the drawings:

Fig. 1 is a top plan view of the device embodying the invention;

Fig. 2 is a fragmentary side elevational view of the device shown in Fig. 1;

Fig. 3 is a front elevational view of said device;

Fig. 4 is an enlarged longitudinal sectional view of the device shown in Fig. 1;

Fig. 5 is a sectional view taken as on line 5—5 of Fig. 4 and looking in the direction indicated by the arrows;

Fig. 6 is a sectional view taken as on line 6—6 of Fig. 4 and looking in the direction indicated by the arrows; and Fig. 7 is an enlarged fragmentary view of the source of illumination and illustrating a feature of the invention.

Referring more particularly to the drawings wherein like characters of reference designate like parts throughout the several views, the device embodying the invention comprises a housing 8 formed of two identical halves or sections 9 and 10 joined along interfitting longitudinal edges 11.

The identical halves or sections 9 and 10 are preferably formed of artificial resinous or plastic material by injection molding processes whereby a plurality of such similar units may be simultaneously and economically formed.

The halves or sections embody integrally formed inner portions having lens-supporting grooves 12, 13 and 14 therein for supporting respective condenser lenses 15, 16 and 17.

The lens-supporting grooves are controlled as to their spaced relation with each other in accordance with the related powers of the condenser lenses 15, 16 and 17 and their position with respect to the source of illumination. In this particular instance, the lens 17 has a 26.75 diopter power, lens 16 has a 20.00 diopter power and the lens 15 has a 16.00 diopter power with the lenses 16 and 17 being spaced approximately 18 mm. apart and the lenses 15 and 16 spaced approximately 24 mm. apart and with the source of illumination being located that the light rays emanating from said condenser lenses will fill the entire area of the objective lens 29 which has a 10.00 diopter power.

Although other lens systems may be employed, the above lens system has been found to produce very satisfactory results. The halves or sections 9 and 10 are further provided with integrally formed slotted sidewall portions 18 having widened portions 19 for receiving channelled bars 20 and 21. The channelled bars 20 and 21, together with the communicating slots 18, are adapted to receive the photographic slides which are to be projected. The bar 21 is of a length greater than the bar 20 to afford ease in placing the slides in and removing them from the slots 18.

Each half or section 9 and 10 tapers forwardly to an end formed with an inner semi-circular bearing seat 22 communicating with inwardly extending tongues 23 for supporting a cylindrical bearing 24. The bearing is preferably formed of metal or other suitable material and has its outer end 25 spun outwardly to overlie a reduced annular portion 26 formed integrally with the forward end of each respective half or section 9 and 10. The cylindrical bearing 24 further has frictional contact with the bearing seats 22 and tongues 23 and is provided, on the inner end thereof, with an inwardly turned lip 27 which functions as stop means for restricting the inner movement of a cylindrical sleeve 28 adjustably fitted within the bearing 24 and which carries an objective lens 29.

It is particularly pointed out that the upper and lower walls of the completed housing 8 are respectively provided with flat surfaces 30 and 31 whereby the device may be rested on a suitable supporting surface 32 such as a table top or the like. Rearwardly of the portions of the housing having the slide supporting slots 18 therein, the said housing is formed with a cylindrical extension 33, inwardly of which is supported the respective condensing lenses 12 and 13. The cylindrical extension 33 has an integrally related outwardly and inwardly tapering portion 35 in which the condenser lens 17 is supported and which is shaped to receive a cone-shaped connector member 38.

The extension 33 is provided with an outer circumferential groove 34 into which the adjacent end of the cone-shaped member 38 is spun to attach said member to said tapered portion 35.

The groove 14 for supporting the condenser lens 17 is formed intermediate a plurality of spaced integrally related fins 36 and an integral annular supporting wall 37.

The lenses 15, 16 and 17 are placed in their respective supporting grooves prior to connecting the two halves or sections 9 and 10 together, that is, they are seated in one section and the other section is then fitted thereover and sealed along the interfitting longitudinal edges 11 by the use of a suitable solvent or adhesive. This joining together of the two sections 9 and 10 further completes the slide-receiving slots 18 and the annular seat 22. After the two sections 9 and 10 have been joined, the objective supporting bearing 24 is fitted and secured in the forward end thereof and the cone-shaped connector member 38 is fitted and secured over the opposed tapered end 35 of the housing. To further insure the securing of the member 38 to the tapered portion of the housing, the said portion is provided with an outer circumferential groove 40 and an opening 41 communicating therewith from the interior of the housing. This is to enable a suitable adhesive or cement to be forced through the opening 41 into the groove 40 whereby the cone-shaped connector member 38 may be adhesively secured to the housing. The said cone-shaped member 38 is provided with an integrally threaded neck portion 42 adapted to receive the threaded end 43 of a conventional flashlight 44 or other suitable means having a source of illumination 45 carried thereby and energized by batteries 46 or other suitable source of electrical energy connected therewith.

The flashlight is of the conventional type embodying a housing 47 shaped to be gripped by the hand whereby the device may be hand-supported or placed on a suitable supporting surface as desired.

The arrangement described above is for use in projecting enlarged images of slides onto a suitable projection screen and may be focused by adjustment of the objective lens 29. This is accomplished by moving the sleeve 28 inwardly or outwardly of the bearing 24. If it is desired to use the device as a slide viewer, a diffusing screen 48 is placed intermediate the condensing lenses and source of illumination 45. In this instance, the diffusing screen is preferably made in the form of a cap 49 of plastic material shaped to be frictionally fitted over the source of the illumination 45 as shown in Fig. 7 and the base of the cap functions as the diffusing screen 48 whereby slides may be viewed by looking directly through the objective lens 29.

In addition to spinning the edge 39 in the circumferential groove 34 and adhesively securing the cone-shaped connector member 38 to the adjacent tapered end of the housing, and to further lock said member 38 against possible rotation after assembly with said tapered end, the said member 38 may be provided with an outwardly extending tongue or a plurality of tongues 50 shaped to be extended within suitable notches 51 formed in the annular extension 33 and in communicating relation with the circumferential groove 34. This extending of the tongues in the notches takes place when the edge 39 is spun inwardly of the groove 34. It is particularly pointed out that the groove 34 has a surface which tapers inwardly in a direction opposed to the taper of the adjacent end 35 of the housing.

If it is desired to connect the source of illumination 45 with a separate source of electrical energy, such as house current, the batteries 46 may be replaced by a suitable transformer in a known conventional manner.

It is further to be understood that although a diffusing cap is shown to be positioned directly over the source of illumination 45, the said diffusing screen may be in the form of a disc suitably located intermediate the slide and source of illumination.

Although the housing has been described as being preferably formed by injection molding plastic material, it is to be understood that the said housing halves or sections 9 and 10 may be formed by casting suitable lightweight metal such as aluminum to the shape desired. The sections, however, will be identical, as previously described above, and will be fitted and joined together along longitudinal edges such as 11 by soldering or other means.

To insure frictional engagement between the sleeve 28 and the bearing 24, the said bearing 24 is provided with a cut-out area 52 having a resilient tongue 53 formed therein. The tongue 53 normally has an initial set to extend inwardly of the bearing whereby the positioning of the sleeve 28 in said bearing will cause said tongue to be flexed outwardly and thereby maintain a frictional engagement with the side of the bearing. One or more of said tongues 53 may be provided, if desired.

From the foregoing description, it will be seen that simple, efficient, and economical means have been provided for accomplishing all of the objects and advantages of the invention.

Having described my invention, I claim:

1. A relatively inexpensive and portable photographic slide illuminating device comprising a long and narrow housing having a front portion and a rear portion, said housing being formed of two identical parts, one constituting the upper and the other the lower half of said housing, and joined with each other along adjacent longitudinal edges, a hollow bearing member located within the front portion of said housing with its forward end turned over the front end of said housing and an annular member fitting about the rear portion of said housing and affixed thereto, said bearing member further serving to support an objective slidably mounted therein to move axially of said housing and said annular member further having a rearwardly protruding portion adapted for connection of the housing with suitable illuminating means, condenser lens means mounted within said housing toward the rear end thereof, said housing having a pair of aligned slots located in opposite side walls intermediate said condenser lens means and the bearing member to provide means for receiving photographic slides to be illuminated, and a bottom surface portion of said housing intermediate its ends being flattened whereby the device may be rested on a supporting surface such as a table top.

2. A relatively inexpensive and portable photographic slide illuminating device comprising a long and narrow housing having a front portion and a rearwardly tapering rear portion, said housing being formed of two identical parts, one constituting the upper and the other the lower half of said housing, and joined with each other along adjacent longitudinal edges, a hollow bearing member located within the front portion of said housing with its forward end turned over the front end of said housing and a cone-shaped member fitting about the rear portion of said housing and affixed thereto, said bearing member further serving to support an objective slidably mounted therein to move axially of said housing and said cone-shaped member further having a rearwardly protruding threaded portion adapted for detachable connection of the housing with a flashlight, condenser lens means mounted within said housing toward the rear end thereof, said housing having a pair of aligned slots located in opposite side walls intermediate said condenser lens means and the bearing member to provide means for receiving photographic slides to be illuminated, and a bottom surface portion of said housing intermediate its ends being flattened whereby the device may be rested on a supporting surface such as a table top.

3. A relatively inexpensive and portable photographic slide illuminating device comprising a long and narrow housing having a front portion and a rear portion, said housing being formed of two identical parts, one constituting the upper and the other the lower half of said housing, and joined with each other along adjacent longitudinal edges, a hollow bearing member located within the front portion of said housing with its forward end turned over the front end of said housing and an annular member fitting over the rear portion of said housing and affixed thereto, said bearing member further serving to support an objective slidably mounted therein to move axially of said housing, and said annular member further having means for detachable connection with illuminating means, condenser lens means mounted in said housing toward the rear end thereof, said housing having a pair of aligned slots located in opposite side walls intermediate said condenser lens means and the bearing member, and a pair of channel members one located at the top and the other at the bottom of said slots and facing each other to provide means for receiving photographic slides to be illuminated, one of said channel members being longer than the other to assist in the insertion and removal of the slides.

4. A relatively inexpensive and portable photographic slide illuminating device comprising a long and narrow housing having a forwardly tapering front portion and a rearwardly tapering rear portion, said housing being formed of two identical parts, one constituting the upper and the other the lower half of said housing, and joined with each other along adjacent longitudinal edges, a cylindrical bearing member located within the front portion of said housing with its forward end turned over the front end of said housing and a cone-shaped member snugly fitting over the opposed end of said housing and affixed thereto to aid in holding said upper and lower halves of the housing in assembled relation, said bearing member further serving to support an objective slidably mounted therein to move axially of said housing, and said cone-shaped member further having means for detachable connection with illuminating means, condenser lens means mounted in said housing toward the rear end thereof, said housing having a pair of aligned slots located in opposite side walls intermediate said condenser lens means and bearing member, a pair of channel members one located at the top and the other at the bottom of said slots and facing each other to provide means for receiving photographic slides to be illuminated, the bottom one of said channel members being longer than the other to assist in the insertion and removal of the slides, and the bottom surface portion of said housing intermediate its ends and adjacent the greatest diametric dimension thereof being flattened whereby the device may be rested on a supporting surface such as a table top.

5. A relatively inexpensive and portable photographic slide illuminating device comprising a long and narrow housing having a front portion and a rear portion, a hollow bearing member located within the front portion of said housing and attached thereto, an annular member fitting about the rear portion of said housing and affixed thereto, said bearing member further serving to support an objective slidably mounted therein to move axially of said housing and said annular member further having a rearwardly protruding portion adapted for detachable connection of the housing with suitable illuminating means, condenser lens means mounted within said housing toward the rear end thereof, said housing having a pair of aligned slots located in opposite side walls intermediate said condenser lens means and the bearing member to provide means for receiving photographic slides to be illuminated, and a removable light-diffusing member positionable between the condenser lens means and illuminating means whereby the device may be adapted for direct viewing or for projecting an image of the photographic slides.

6. A device of the character described comprising a relatively long and narrow housing formed of two identical halves joined along interfitting longitudinal edges, said housing having relatively flat upper and lower wall portions, a forward annular end portion, a rearwardly and inwardly tapering opposed end portion and vertically disposed slots in the opposite side walls thereof intermediate said forward end portion and said rearwardly tapering end portion, a condensing lens system in said rearwardly and inwardly tapering portion rearwardly of the vertical slots in the side walls of the housing, a cylindrical shaped bearing within said forward annular end portion and attached thereto, an objective lens adjustably mounted in said bearing, and means limiting the movement of said objective lens inwardly of the bearing, and means for attaching a source of illumination to the rearwardly and inwardly tapering end portion, comprising a cone-shaped portion fitted over and secured to said rearwardly and inwardly tapering end portion and having a protruding portion with means associated therewith for connection with the source of illumination.

7. A device of the character described comprising a relatively long and narrow housing formed of two identical parts joined with each other along interfitting longitudinal edges, said housing having a forward annular end portion, a rearwardly and inwardly tapering opposed end portion and vertically disposed slots in the opposite side walls thereof intermediate said forward end portion and said rearwardly tapering end portion, said rearwardly tapering end portion having inner grooved portions in fixed spaced relation with each other, a condensing lens system having its lenses supported by said spaced grooved portions and fitted therein prior to the joining of the halves of the housing, a hollow bearing in said forward annular end portion having its end turned over the end of said forward portion of the housing, an objective lens adjustably mounted in said bearing, and an annular member about the opposed end of the housing and having means for attaching a source of illumination to the rearwardly and inwardly tapering end of the housing.

8. A device of the character described comprising a relatively long and narrow housing formed of two identical parts joined with each other along interfitting longitudinal edges, said housing having a forward annular end portion, a rearwardly and inwardly tapering opposed end portion and vertically disposed slots in the opposite side walls thereof intermediate said forward end portion and said rearwardly tapering end portion, said rearwardly tapering end portion having inner grooved portions in fixed spaced relation with each other, a condensing lens system having its lenses supported by said spaced grooved portions and fitted therein prior to the joining of the halves of the housing, a cylindrical bearing within said forward annular end portion and attached thereto, an objective lens adjustably mounted in said bearing, and means for attaching a source of illumination to the rearwardly and inwardly tapering end of the housing, said means comprising a cone-shaped portion fitted over and secured to said rearwardly and inwardly tapering end of the housing and having a protruding portion with means adapted for connection with a source of illumination.

9. A photographic slide illuminating device comprising a relatively long and narrow housing having a forward annular end portion, a rearwardly and inwardly tapering opposed end portion and vertically disposed slots in the opposite walls thereof intermediate said forward end portion and said rearwardly tapering end portion, a pair of channel members one in the top and the other in the bottom of said slots and facing each other to receive photographic slides, the channel member in the bottom of the slots being longer than the other to assist in the insertion and removal of said slides, a condensing lens system in said rearwardly and inwardly tapering portion rearwardly of the vertical slots, an objective lens adjustably mounted in the forward end portion of the housing and means for attaching a source of illumination to the rearwardly and inwardly tapering end portion and in substantial optical alignment with the condensing lenses.

References Cited in the file of this patent

UNITED STATES PATENTS

| | | |
|---|---|---|
| 778,891 | Rausch | Jan. 3, 1905 |
| 1,992,776 | Schindler | Feb. 26, 1935 |
| 2,126,415 | Scheele | Aug. 9, 1938 |
| 2,152,424 | Wetmore | Mar. 28, 1939 |
| 2,357,542 | Pfeil | Sept. 5, 1944 |
| 2,366,554 | Peck | Jan. 2, 1945 |
| 2,445,651 | Weavie | July 20, 1948 |
| 2,478,336 | Stein et al. | Aug. 9, 1949 |
| 2,543,113 | Leavitt | Feb. 27, 1951 |

FOREIGN PATENTS

| | | |
|---|---|---|
| 191,468 | Great Britain | Jan. 12, 1923 |